(12) United States Patent
Volpe et al.

(10) Patent No.: US 10,608,937 B1
(45) Date of Patent: Mar. 31, 2020

(54) DETERMINING DESTINATION RESOLUTION STAGES FOR FORWARDING DECISIONS

(71) Applicant: Amazon Technologies, Inc., Seattle, WA (US)

(72) Inventors: Thomas A. Volpe, Austin, TX (US); Kari Ann O'Brien, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 782 days.

(21) Appl. No.: 14/981,672

(22) Filed: Dec. 28, 2015

(51) Int. Cl.
| | | |
|---|---|---|
| *H04L 12/28* | (2006.01) | |
| *H04L 12/743* | (2013.01) | |
| *H04L 12/723* | (2013.01) | |
| *H04L 29/06* | (2006.01) | |
| *H04L 12/709* | (2013.01) | |

(52) U.S. Cl.
CPC ........ *H04L 45/7453* (2013.01); *H04L 45/245* (2013.01); *H04L 45/50* (2013.01); *H04L 69/22* (2013.01)

(58) Field of Classification Search
CPC ... H04L 45/7453; H04L 45/245; H04L 45/50; H04L 69/22
USPC .......................................................... 370/392
See application file for complete search history.

(56) References Cited

U.S. PATENT DOCUMENTS

| | | | |
|---|---|---|---|
| 7,031,304 B1 | 4/2006 | Arberg et al. | |
| 7,382,782 B1 | 6/2008 | Ferguson et al. | |
| 7,738,385 B2 | 6/2010 | Buduma et al. | |
| 7,764,621 B1 | 7/2010 | Busch et al. | |
| 2001/0055274 A1 | 12/2001 | Hegge et al. | |
| 2002/0146009 A1* | 10/2002 | Gupta | ..................... H04L 45/00 370/392 |
| 2006/0176880 A1 | 8/2006 | Bare et al. | |
| 2013/0343390 A1* | 12/2013 | Moriarty | ............. H04L 43/0852 370/392 |
| 2014/0293786 A1* | 10/2014 | Lin | ......................... H04L 47/17 370/235 |

OTHER PUBLICATIONS

U.S. Appl. No. 15/199,501, filed Jun. 30, 2016, Thomas A. Volpe, et al.
U.S. Appl. No. 14/981,656, filed Dec. 28, 2015, Leonard Thomas Tracy, et al.

\* cited by examiner

*Primary Examiner* — Ricky Q Ngo
*Assistant Examiner* — Ellen A Kirillova
(74) *Attorney, Agent, or Firm* — Robert C. Kowert; Kowert, Hood, Munyon, Rankin & Goetzel, P.C.

(57) ABSTRACT

Destination resolution stages that determine a forwarding decision for a network packet may be selected. Different resolution stages in a packet processing pipeline may be individually identified. Upon accessing an entry in a lookup table in a stage of the packet processing pipeline, a pointer type of a pointer in the entry may identify a next destination resolution stage for determining the forwarding decision of a network packet. Different types of network packets may have forwarding decisions determined using different destination resolution stages, one or more shared resolution stages, or the same resolution stages.

20 Claims, 10 Drawing Sheets

DETERMINING DESTINATION RESOLUTION STAGES FOR FORWARDING DECISIONS

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

Figure 1:
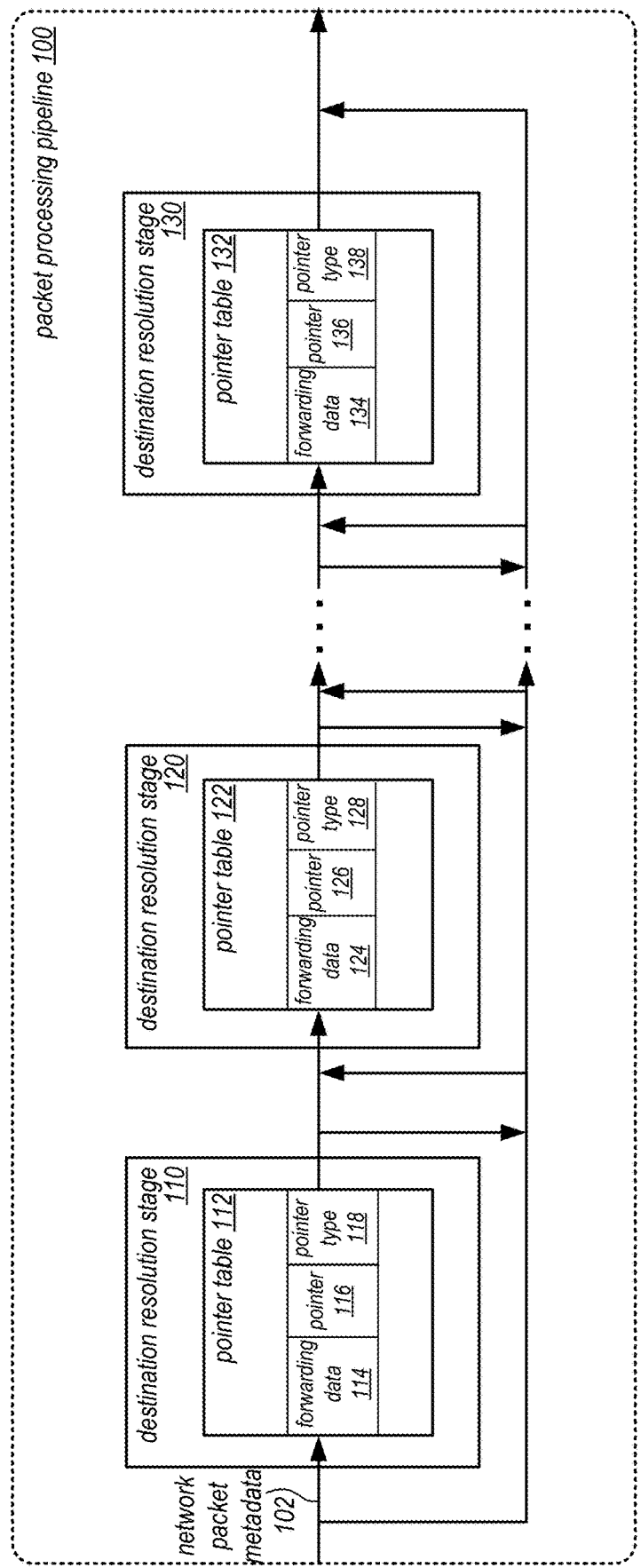
FIG. 1 illustrates a logical block diagram of selectively determining destination resolution stages for forwarding decisions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement selectively determining destination resolution stages for forwarding network packets. Network packets are packets of data (e.g., datagrams) sent across a network from a source networking device (e.g., a network interface card implemented at a computer or server) to a destination networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. Consider a network packet that includes a destination address formatted in accordance with Internet Protocol (IP). A forwarding route may be an address or portion of an address which if matching the destination address for the network packet, identifies forwarding decision(s) to be made with respect to the network packet, such as a next hop address. Once a forwarding decision is made, modifications to the packet may be performed, and the packet sent to a next networking device connected to the current networking device (or the networking packet may be dropped). Forwarding of the network packet may continue amongst the networking devices of a network until the network packet reaches the desired destination.

Forwarding decisions may be determined in one or more stages, such as destination resolution stages. Different lookup operations to determine actions to be performed with respect to a network packet may be identified for a network packet by reading different entries in different lookup tables associated with the destination resolution stages. For example, a destination resolution stage may be used to obtain information to initiate tunneling for a network packet, provide multipath lookups, obtain labels to add to a packet for multiprotocol label switching, determine a next hop address, perform fast re-route, or implement link aggregation.

Different types of network packets, such as IP packets described above, may be forwarded according to various destination resolution stages. Thus, packet processing pipelines that process the different types of network packets may need to implement the appropriate destination resolution stages according to the desired techniques to be performed. Typically, packet processing pipelines have been implemented to recirculate network packets among destination resolution stages multiple times in order to perform different lookups at the same destination resolution stages or have relied upon techniques to encapsulate entries at a commonly accessed table, such as a next hop address (NHA) table, so that the appropriate lookup information may be obtained or utilized in one location. However, such techniques often result in different processing times for determining a forwarding decision for different packets, which in high volume/workload scenarios can decrease packet processing performance—particularly across multiple networking devices that exhibit similar varying performance characteristics. Selectively determining destination resolution stages allows for destination resolution stages to be pipelined so that the appropriate destination resolution stages may perform lookup operations to make a forwarding decision without returning to prior stages. Moreover, consistent processing times may be achieved for network packets as each destination resolution stage in the pipeline may operate in a consistent manner (e.g., a consistent number of cycles), even if not selected for determining a forwarding decision.

FIG. 1 illustrates a logical block diagram of selectively determining destination resolution stages for forwarding decisions, according to some embodiments. Packet processing pipeline 100 may be implemented by dedicated circuitry or other processing hardware, such as general purpose processors executing program instructions to implement packet processing pipeline 100. Packet processing pipeline 100 may implement multiple different destination resolution stages, such as destination resolution stages 110, 120 and 130. Network packet metadata 102 for a network packet may be processed at the different destination resolution stages in order to determine a forwarding decision for a corresponding network packet.

Network packet metadata 102 may be metadata included in or obtained from a network packet, and/or data or other information determined or generated for a network packet at previous stages in packet processing pipeline 100 (not illustrated). For example, a parser, such as parser 320 in FIG. 3, may have located and retrieved information about the network packet, such as a destination address. A longest matching prefix stage may have compared the destination address with different forwarding routes to identify a forwarding route that best matches the destination address and included metadata identifying the forwarding route, such as a pointer to data associated with the identified forwarding route.

In at least some embodiments, network packet metadata 102 may include a pointer to a pointer table at one of destination resolution stages 110, 120, or 130, which may be identified according to a pointer type for the pointer. For example, destination resolution stage 110 may be tunnel initiation stage and network packet metadata may include a pointer that is identified as a tunnel type pointer. Thus, destination resolution stage 110 may be selected to perform a lookup operation at pointer table 114 utilizing the tunnel pointer in network packet metadata 102.

Figure 5:
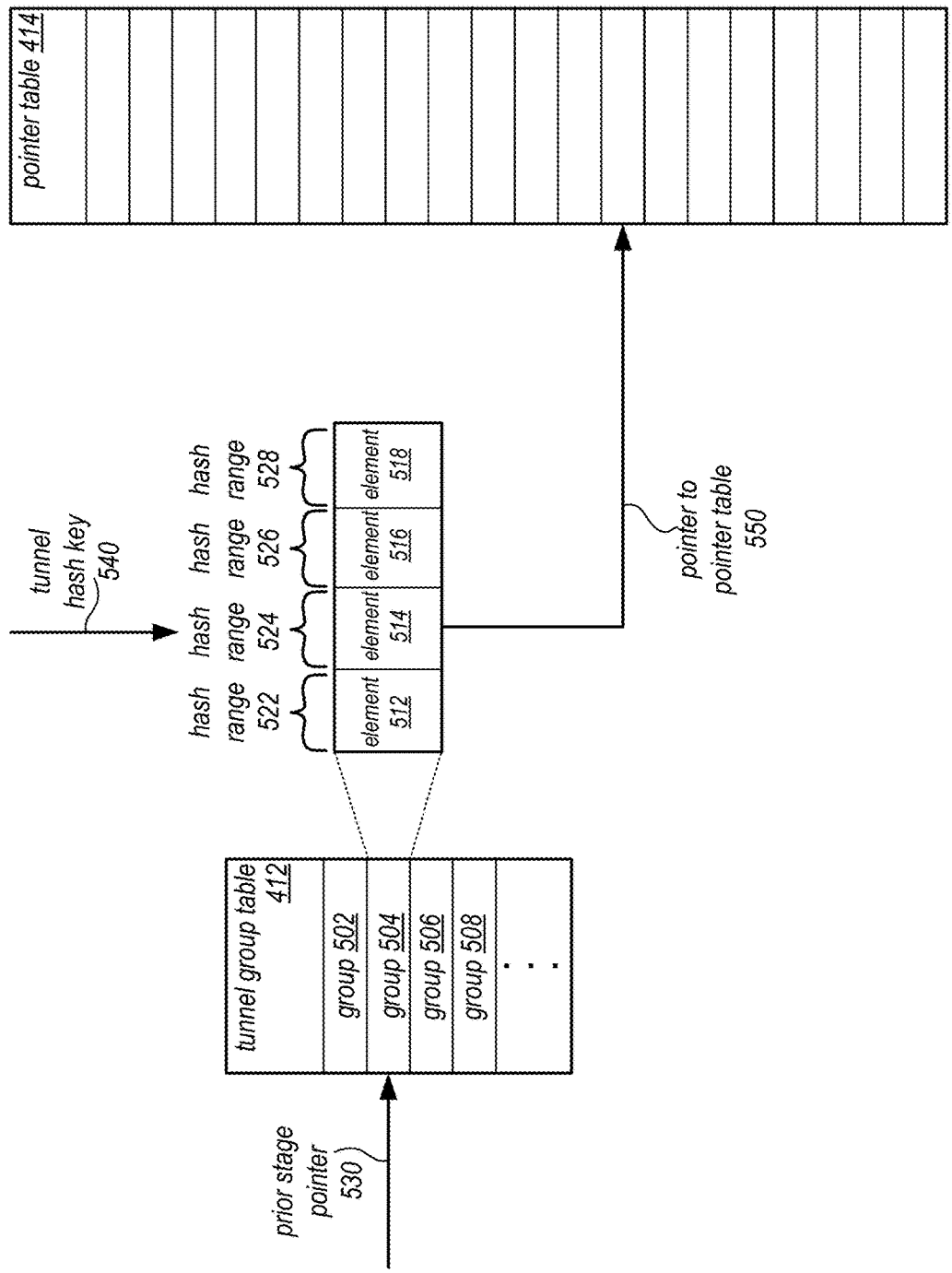
FIG. 5 is a logical block diagram illustrating a tunnel group table and tunnel pointer table, according to some embodiments.

Pointer tables, such as pointer table 112, pointer table 122 and pointer table 132, may include information in entries to make forwarding decisions, such as forwarding data 114, 124, and 134 in the illustrated entries at pointer table 112, 122, and 132 and may be maintained in one or more memory devices (e.g., random access memory devices such as SRAM or DRAM). Continuing with example given above, forwarding data 124 may be data used to initiate a tunneling protocol that is obtained from the entry and included in network packet metadata 102 so that a subsequent stage (e.g., packet modifier 370 in FIG. 3) may modify the network packet to generate a tunneled version according to the tunnel initiation data. In addition to forwarding data, entries in pointer tables may include a pointer to another lookup table, such as pointers 116, 126, and 136. These pointers may be used to access other entries in other pointer tables, whether directly (or indirectly as illustrated in FIG. 5). Respective pointer types, such as pointer types 118, 128, and 138 may be indicated in entries as well so that the destination resolution stage to which the pointer is pointing can be identified. In this way, pointer types may direct the selection of a next destination resolution stage to perform a lookup operation for the network packet.

Figure 6:
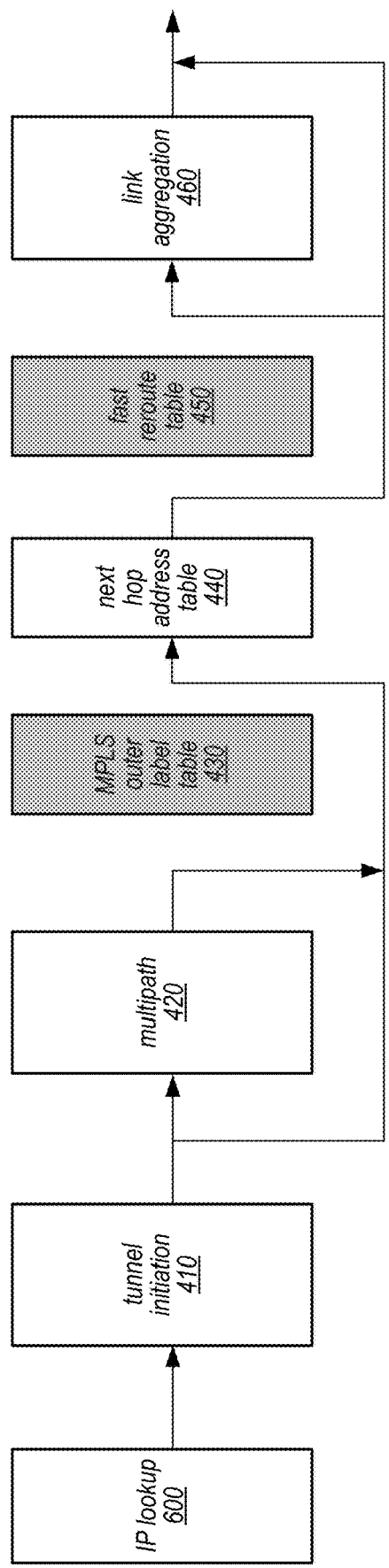
FIG. 6 is a data flow diagram illustrating destination resolution stage selections for forwarding a network packet according to an Internet Protocol address, according to some embodiments.
Figure 7:
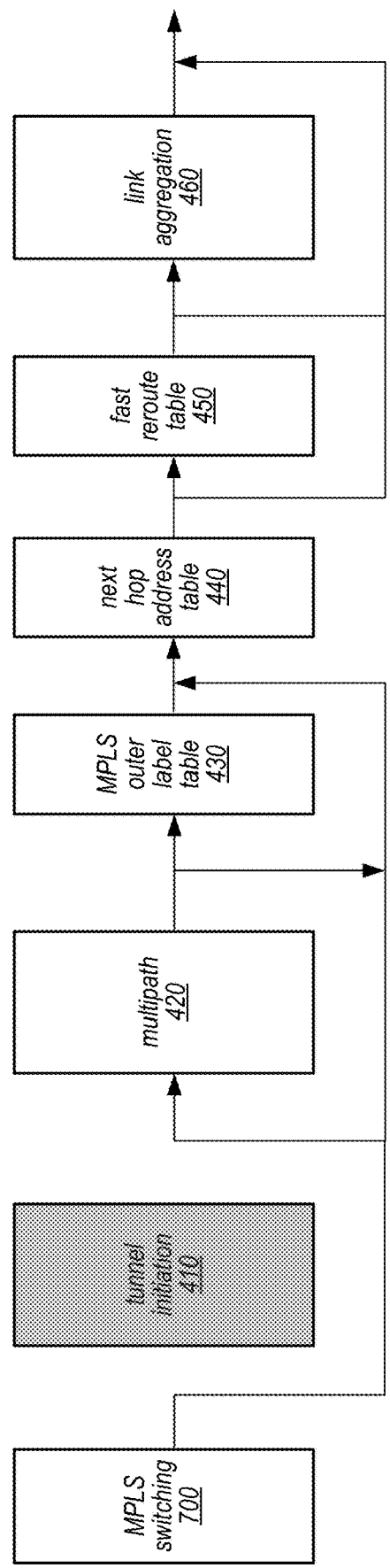
FIG. 7 is a data flow diagram illustrating destination resolution stage selections for forwarding a network packet according to Multiprotocol Label Switching, according to some embodiments.
Figure 8:
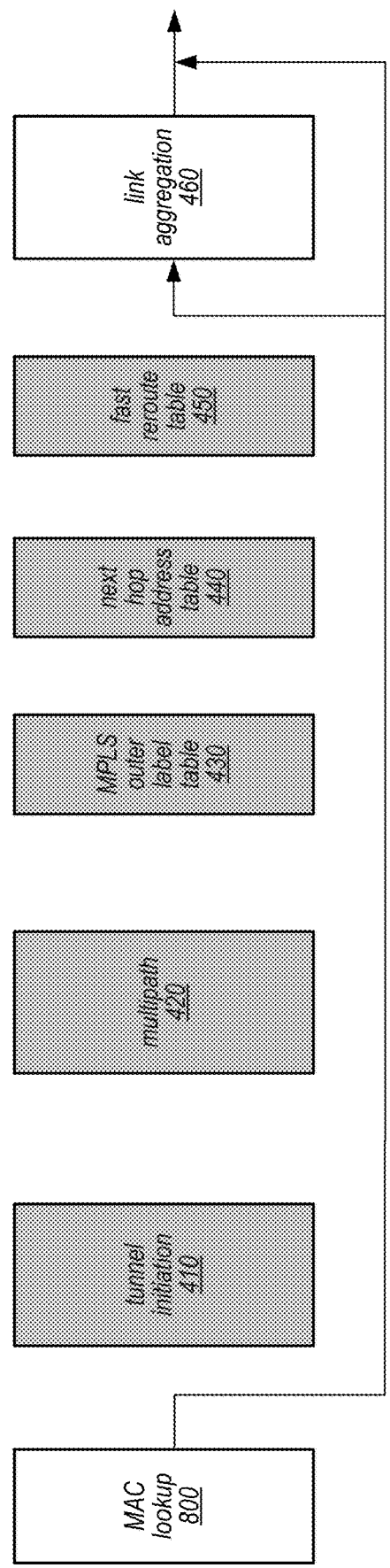
FIG. 8 is a data flow diagram illustrating destination resolution stage selections for forwarding a network packet according to a Media Access Control address, according to some embodiments.

By allowing pointer types to identify the next destination resolution stage to perform a lookup operation for a forwarding decision, packet processing pipeline 100 can be utilized to process different types of network packets and provide many variations for determining a forwarding decision. For example, pointer type 118 may indicate that pointer 116 is a pointer to pointer table 132 in destination stage 130. Thus, destination resolution stage 120 (and any other intervening destination resolution stages in packet processing pipeline 100) may be effectively skipped or not considered. Similarly, destination resolution stages 110 and/or 130 may be skipped, or all destination resolution stages may be utilized. FIGS. 6-8 illustrate different combinations of destination resolution stages that may be implemented. Note that skipped destination resolution stages may still run a no-op that does not affect the determination of the forwarding decision for the network packet.

Pointer table entries may be initially written, updated, or removed by a controller or other component with access to pointer tables. In this way, packet processing pipeline 100 can be reconfigured by changing the entries of individual pointer tables. For packet processing pipelines implemented in dedicated (and unchangeable) circuitry (e.g., an application specific integrated circuit (ASIC)), the ability to reconfigure the pipeline for different types of network packets or for select network packets (e.g., packets directed to a particular destination address) without requiring changes in the hardware increases the capabilities of the device implementing the packet processing pipeline to adapt to changing packet processing requirements.

Note that the illustration and accompanying discussion of selectively determining destination resolution stages for forwarding network packets is not intended to be limiting, but is instead provided as a logical illustration. Various other components, mechanisms, and other arrangements than those illustrated in FIG. 1 may be utilized to implement selectively determining destination resolution stages. Pointer table 132, for instance, as a last destination resolution stage may only maintain forwarding data 134 in respective entries (and not a pointer 136 or pointer type 138). In another example, multiple tables may be included at each destination resolution stage to distribute pointers for a destination resolution stage across different groups, such as discussed below with regard to FIG. 5.

The systems and methods described herein may implement indirect destination determinations to forward tunneled network packets. Tunneling may be initiated for network packets according to tunneling initiation data maintained in a tunnel table entry, such as at a pointer table like pointer table 112 at destination resolution stage 110. The tunnel table entry may also include a pointer to an entry in a next hop address (or to another destination resolution stage with an entry that ultimately points to a next hop address) that corresponds to a forwarding route selected for the network packet (e.g., at a forwarding engine, such as a Level 3 (L3) forwarding engine). By decoupling the pointer of a next hop address from a single fixed stage (e.g., from a L3 forwarding engine), redundant entries in the NHA and other lookup tables may be eliminated. For example, if a network packet were received and matched to a forwarding route by an L3 engine which included a pointer table with an entry that pointed directly to another entry in the NHA table, and tunneling is enabled and applied to the network packet such that the destination address for the network packet is changed, then the new destination address would have to be processed at the L3 engine again to determine a forwarding route that matched the new destination address, even though ultimately the tunneled version of the network packet with the new destination address may be being forwarded to the same location as pointed to the first time the network packet was processed at L3. Such a scenario results in another entry having to be maintained that matches the new destination address and another pointer which may point to the same next hop address. Similar destination address changes made at other destination resolution stages could result in further entries being maintained in the L3 forwarding engine to point to the same entry in the next hop table. Indirect destination determinations may eliminate redundant entries as tunnel pointer table maintains a next hop address entry (or a pointer that ultimately leads to a destination resolution stage with a next hop address entry).

This specification begins with a general description of a networking device, which may implement selective determination of destination resolution stages and/or indirect destination determinations for forwarding tunneled network packets as part of packet processing at a packet processor. Then various examples of a packet processor are discussed, including different components/modules, or arrangements of components/modules that may be implemented and which may select destination resolution stages and/or perform indirect destination determinations. A number of different methods and techniques to implement selective determination of destination resolution stages and/or indirect destination determinations for forwarding tunneled network packets are then discussed, some of which are illustrated in accompanying flowcharts. Various examples are provided throughout the specification.

Figure 2:
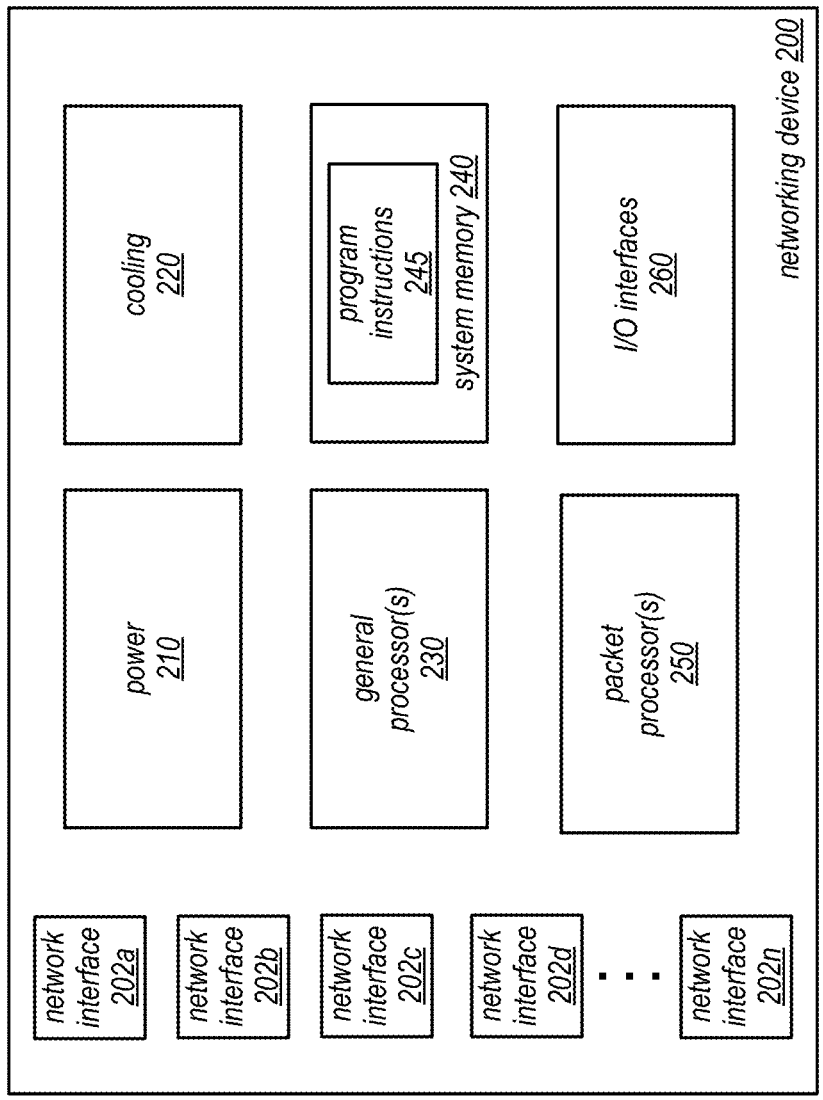
FIG. 2 is a logical block diagram illustrating a networking device that implements a packet processor, according to some embodiments.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking devices, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, pointer tables, action tables, insert or remove forwarding routes, etc.). For example, a controller may be configured to program the hash schemes that generate hash keys to locate entries in pointer tables (e.g., by specifying different fields for in a packet header), as well as distribution schemes for mapping hash values to a group of entries in a pointer tables. A controller may, in some embodiments, be configured to change the pointers and pointer type values associated with particular entries (e.g., in accordance with a change in a forwarding route) in order to reconfigure the processing of different packets at destination resolution stages in a packet processor.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
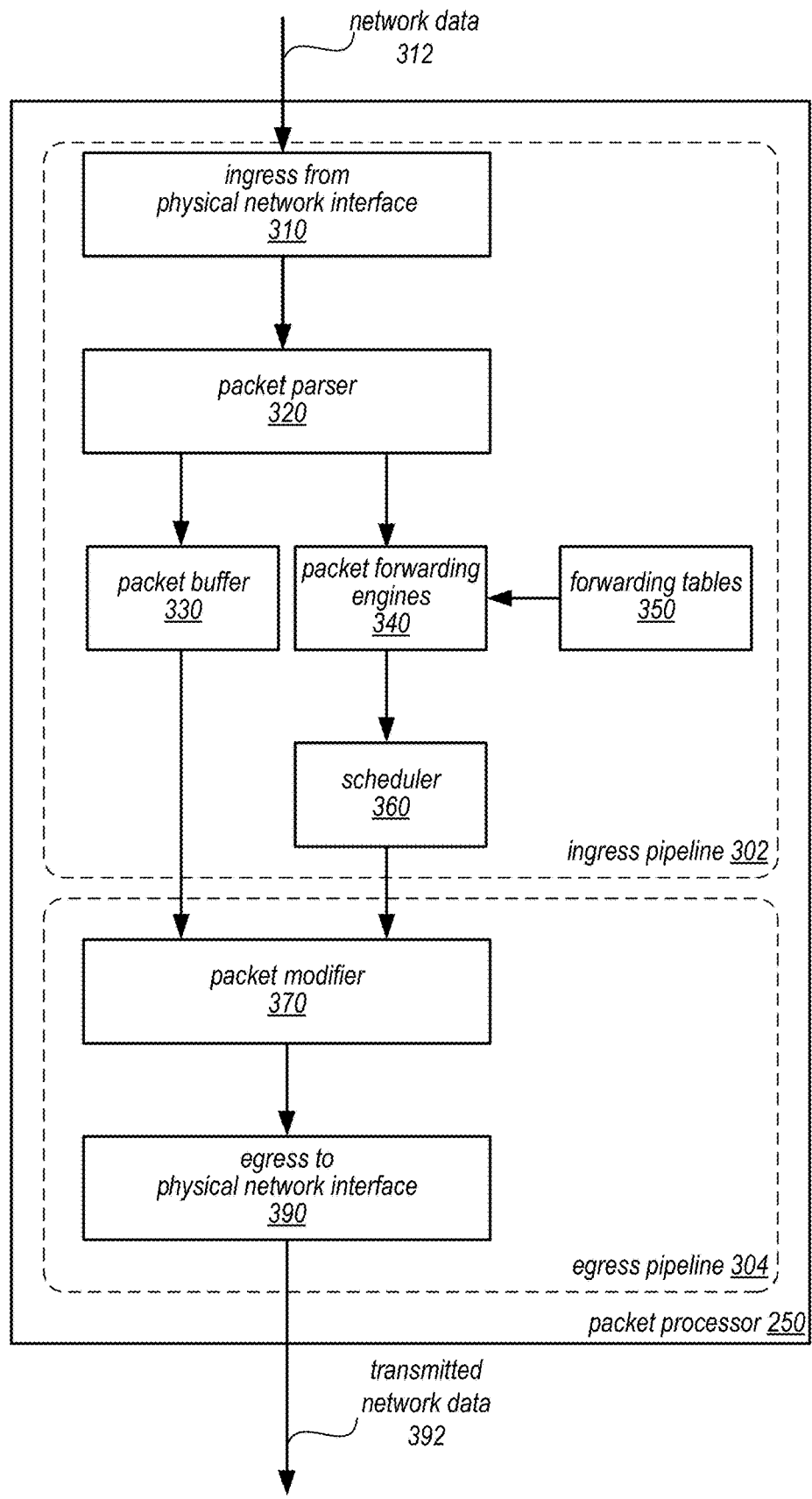
FIG. 3 is a logical block diagram illustrating a packet processor that implements packet forwarding engines that perform selectively determining destination resolution stages, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), system-on-a-chip (SoC), or other dedicated circuitry that performs packet processing. Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340. In some embodiments, packet parser 320 may determine different hash key values to determine an entry in pointer tables in different destination resolution stages (e.g., tunnel initiation stage 410, multipath stage 420, or link aggregation stage 460) from various metadata fields (e.g., fields from layers 1, 2, 3, and 4 of the network packet and bits from the UDF). Hash key values generated for a network packet can be generated for a specific type of network packet (e.g., IP or MPLS) and may be generated according to one of many different hash functions (e.g., CRC16-CITT and CRC16-IBM).

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, in some embodiments. For example, internet protocol (IP) headers for the packet may be evaluated with respect to entries in tables, such as a routing or next hop table, to determine forwarding to be performed. Packet forwarding engines may include other forwarding decision engines that include the various destination resolution stages illustrated in FIG. 4—just as the group and/or pointer tables discussed below with regard to FIG. 4 may be implemented in forwarding tables 350. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a CAM, such as a TCAM, and/or random access memory, such as SRAM) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
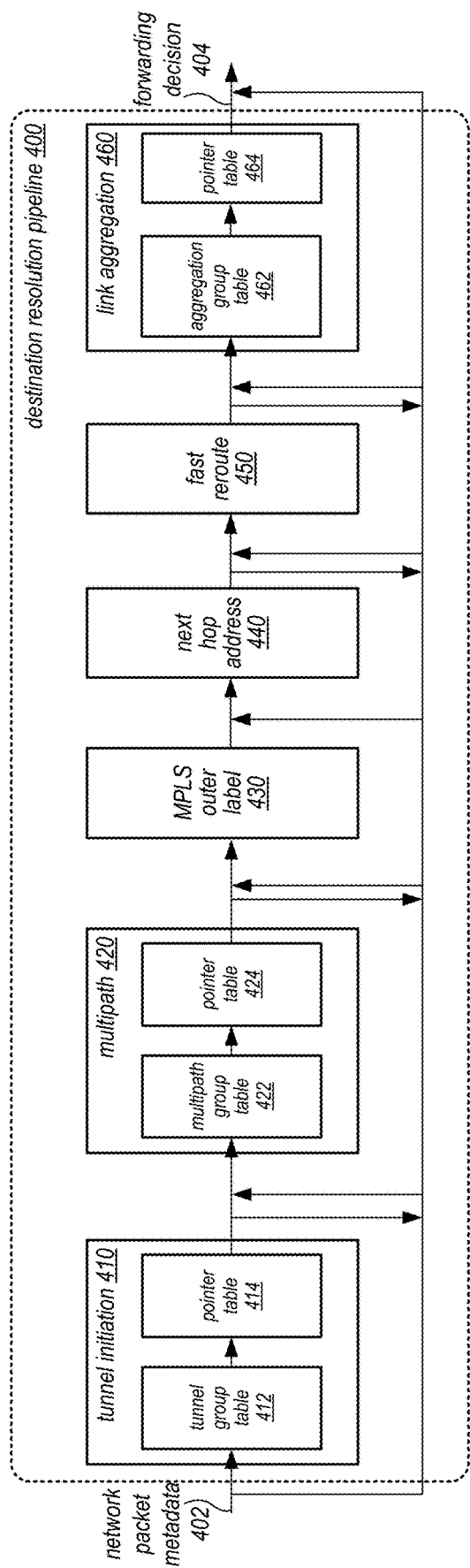
FIG. 4 is a logical block diagram illustrating a destination resolution pipeline, according to some embodiments.
Figure 9:
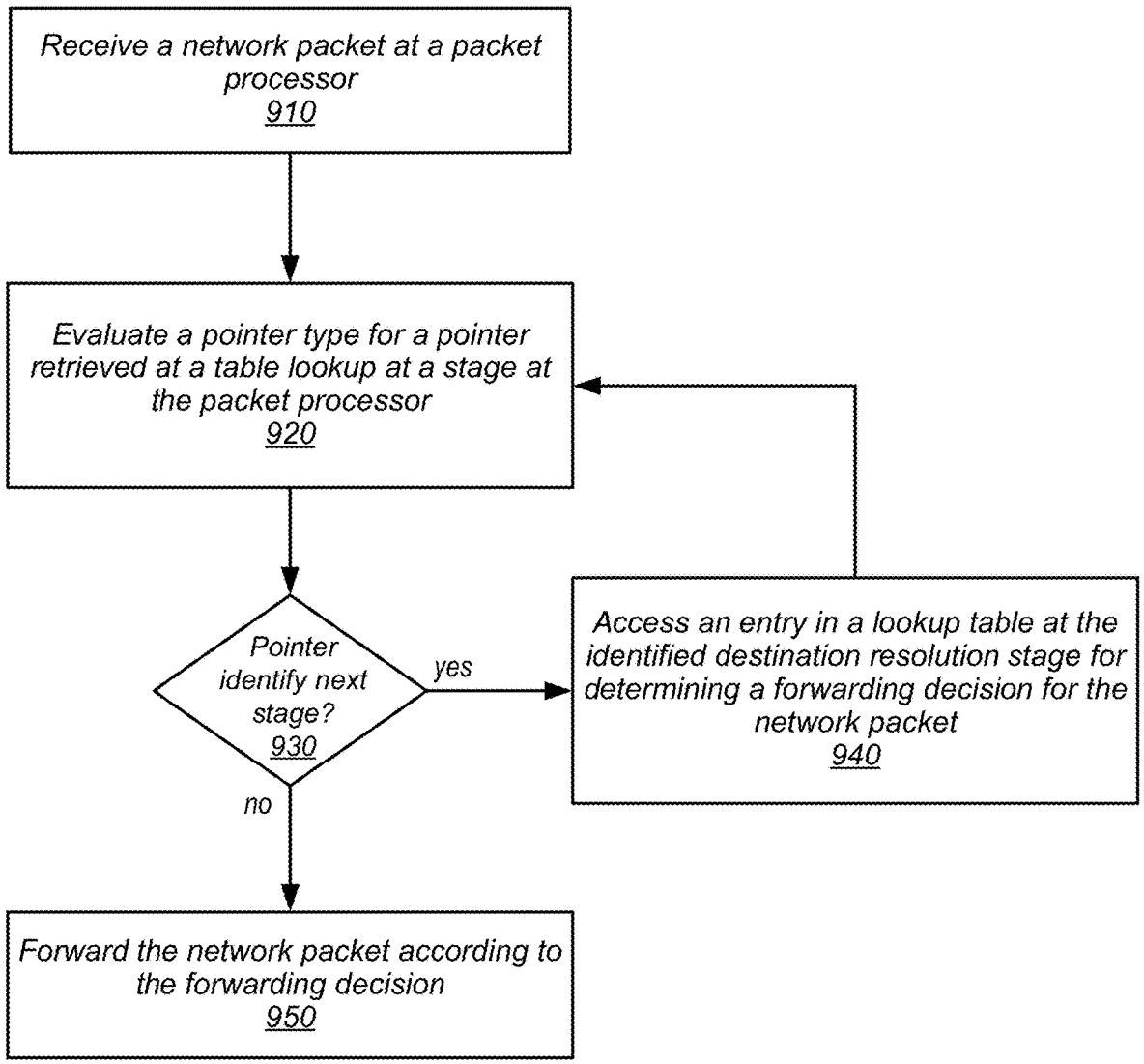
FIG. 9 is a high-level flowchart illustrating various methods and techniques to implement selectively determining destination resolution stages, according to some embodiments.

FIG. 4 is a logical block diagram illustrating a destination resolution pipeline, according to some embodiments. Destination resolution pipeline 400 may implement multiple different destination resolution stages, such as tunnel initiation stage 410, multipath stage 420, multiprotocol label switching (MPLS) outer label stage 430, next hop address stage 440, fast re-route stage 450, and link aggregation stage 460. When network packet metadata 402 is received, different destination resolution stages may be selected based on accessing an entry in a pointer table at prior stages (either in destination resolution pipeline 400 or a prior stage in packet processing pipeline 302 (e.g., another forwarding engine)), evaluating the pointer type of the pointer to identify a next destination resolution stage corresponding to the pointer type, and performing a lookup operation according to the pointer retrieved from the entry at the prior stage. Once the selected destination resolution stages are complete, forwarding decision 404 may be included in network packet metadata so that subsequent stages, such as scheduler 360, packet modifier 370, and egress to physical network interface 390 can forward the network packet according to the forwarding decision 404. FIG. 9, discussed below, provides different examples of techniques to select different destination resolution stages, which may be implemented with respect to destination resolution pipeline 400.

In at least some embodiments, packet processing pipeline 400 may implement tunnel initiation stage 410. Tunnel initiation stage 410 may lookup tunnel initiation data to start or initiate tunneling for a network packet. A prior stage, such as an L2, L3, or ingress access control list forwarding engine may retrieve a pointer that has tunneling pointer type. The tunneling pointer type may indicate that the pointer is a pointer into tunnel group table 412. While some destination resolution stages may implement single pointer table (e.g., MPLS outer label stage 430, next hop address stage 440 and fast re-route stage 450 or other versions of tunnel initiation stage 410, multipath stage 420 or link aggregation stage 460 not illustrated which do not implement group tables) other destination resolution stages may utilize a group table and a pointer table in order to manage the distribution of selecting entries in the pointer tables. For example, groups within a group table may include different elements which may together map to an entry in a pointer table. FIG. 5 is a logical block diagram illustrating a tunnel group table and tunnel pointer table, according to some embodiments.

Tunnel group table 412 may be composed of different groups, such as groups 502, 504, 506, 508, and so on. Each group has associated group includes different elements. For example, group 504 is illustrated as including elements 512, 514, 516, and 518. Hash ranges may be assigned to the different elements of a group, such as hash range 522 assigned to element 512, hash range 524 assigned to element 514, hash range 526 assigned to element 516, and hash range 528 assigned to element 518. The assignment of hash ranges to different elements for a group may be programmed or reprogrammed by a controller or other component that may access memory maintaining tunnel group table 412. For example larger numbers of network packets may be directed to a pointer entry in pointer table 414 by assigning a greater hash value range to a particular member that maps to the particular pointer. In this way, traffic may be distributed across members in a group (and thus pointers in a pointer table) according to an equal cost (e.g., equal hash ranges) or weighted cost distribution scheme (e.g., different size hash ranges), in some embodiments. For example, different amounts of network traffic may be allocated to different tunnels by directing traffic to different elements that point to tunnel pointers which describe different tunnels (e.g., 20% traffic directed to a particular pointer table pointer may be implemented by assigning 20% of the total hash space to element 512, 40% traffic may be directed to a second pointer mapped to element 514 by setting a hash range equivalent to 40% of the hash space, 25% of traffic may be directed to a third pointer mapped to element 516 equivalent to 25% of the hash space, and 15% of traffic directed to a fourth pointer mapped to element 518 which may be 15% of the hash space).

Table groups may be identified by the prior stage pointer 530, which points to one of the groups (e.g., group 504). Group 504 entry points in turn to the group entries 514 for the identified group. To select from among the multiple elements, a hash key value 540 is utilized. The hash key value may 540 be a hash value generated by parser 320 or some other packet processing stage prior to tunnel initiation 410 based on different fields accessed in the network packet and/or other metadata in the network packet. The hash key value 540 may fall within a range assigned to one of the elements (e.g., hash range 514 assigned to element 514). A pointer to pointer table 550 may be determined by element 514 and group 504 in order to read the identified pointer.

Turning back to FIG. 4, once the appropriate entry for pointer table 414 in tunnel initiation 410, the contents of the entry may be read and evaluated. An entry in pointer table 414 may include (but is not limited to), an indication as to whether the tunnel entry is valid, tunnel initiation data (e.g., a tunnel header index, which points to a location in another memory or storage device to retrieve a copy of a tunnel header which is used to encapsulate the network packet in order to apply tunneling, and a tunnel header size, which indicates the size of the tunnel header, or any other description of tunnel header data to encapsulate the packet, which may be applied at packet modifier 370), a pointer to another destination resolution stage, and/or a pointer type for the pointer. For example, the entry may include a pointer identified as a next hop address pointer so that the next destination resolution stage to process the network packet is next hop address stage 440.

As tunnel pointer table 414 can point directly to next hop address stage 440, the number of entries in next hop address stage 440 need not increase with addition of new tunnel protocols. For example, an IPv6 tunnel applied to an IPv4 network packet may result in a new destination address for the tunneled version of the network packet (e.g., 128 bit address instead of a 32 bit IPv4 destination address). Instead of creating a new entry at next hop address stage 440 to direct the IPv6 address to the same next hop address as original pointed to by the IPv4 destination address, the pointer in the entry describing the tunneling to be applied in pointer table 414 may point to the same next hop address.

Destination resolution pipeline 400 may implement a multipath destination resolution stage 420, in some embodiments. Multipath destination resolution stage 420 may provide weighted cost multipath (WCMP) to distribute network traffic amongst multiple valid paths in a network. Paths may be selected based on a hash of the network traffic flow. Moreover, allocations of network traffic can be weighted per network traffic flow. Note that weighting may not be based on bandwidth, in some embodiments. Similar to tunnel initiation stage 410, multipath stage 420 may implement multipath group table 422 and pointer table 424. In this way, the group entries (as discussed above with regard to FIG. 5) may be programmed to direct network traffic to valid paths according to the weighting of the network traffic flows assigned to each group entry in pointer table 424 for a group in multipath group table 422. Group entries in pointer table 424 may include information to direct network traffic according to the corresponding valid path, a pointer, and type of pointer, in some embodiments. The type of pointer may indicate which one of the subsequent destination resolution stages 430, 440, 450, or 460 may process the network packet.

Destination resolution pipeline 400 may implement multiprotocol label switching (MPLS) outer label stage 430, in some embodiments. As noted above, different types of network packets (e.g., L2, L3, or MPLS) may be processed at destination resolution pipeline 400. MPLS outer label stage 430 may provide new MPLS labels as needed for some network packets being tunneled in MPLS or MPLS packets. Entries in MPLS outer label stage (which may include a single pointer table not illustrated in FIG. 4) may include an indication of whether or not an entry is valid, information describing or pointing to the new outer label to be added/swapped (e.g., an outer label index), a pointer and pointer type. Note that in some embodiments, as is illustrated in FIG. 4, next hop address stage 440 may not be skipped when making a forwarding decision so the pointer type may not be included in embodiments where next hop address stage 440 directly follows MPLS outer label stage 430.

Destination resolution pipeline 400 may implement next hop address stage 440, in some embodiments. Next hop address stage 440 may provide entries describing a next hop address (which may be a directly connected host to the networking device or an indirectly connected subnet) for different network packets corresponding to various forwarding routes (e.g., as may be pointed to by an L3 or MPLS forwarding engine or by an access control list rule) or other destination resolution stage (e.g., tunnel initiation stage 410, multipath stage 420, and/or MPLS outer label stage 430). If a pointer does not point to a valid entry in next hop address stage 440, then the network packet may be trapped, forwarded, or logged for the controller to process. Entries in next hop address stage 440 may include an indication as to whether the entry is valid, an entry for address resolution protocol (ARP), a destination MAC address index, an indication as to whether an egress virtual local area network (VLAN) is valid, an egress VLAN, an egress logical port indication, an indication of the maximum transmission unit (MTU), and an indication as to whether the network packet should be mirrored. In some embodiments, entries may also include tunnel information (which may supersede tunnel information in tunnel initiation stage 410), such as an indication as to whether tunneling is enabled for the network packet, an index or location of a tunnel header to insert to enable tunneling, and a tunnel header size.

Destination resolution pipeline 400 may implement fast re-route stage 450, in some embodiments. Fast re-route stage 450 may provide a quick substitution of a back-up link when a link goes down. For MPLS packets, if fast re-route is enabled for the logical port selected in the next hop address stage 440. The packet may be encapsulated with an fast re-route label (e.g., by packet modifier 370) and provided with an alternate egress port and DMAC address. Fast re-route label insertion may be enabled and disabled per port (logical or physical) with control registers that indicate whether the port has fast re-route enabled or disabled (i.e. whether the port is down or up). A controller may set the fast re-route label, alternate egress and DMAC address in the fast re-route in advance as back up routes and then enable them with a single change to the control register for the particular port that has gone down, so that MPLS packets that were meant to egress on that particular port will use the backup route.

Destination resolution pipeline 400 may implement link aggregation stage 460, in some embodiments. Link aggregation stage 460 may enable sharing of bandwidth across multiple ports. To enable this feature, link aggregation stage 460 is implemented much like tunnel initiation stage 410 and multipath stage 420, utilizing aggregation group table 462 to select group entries in pointer table 464. A particular group entry in 464 may be determined according to a hash value generated for link aggregation stage 460, which may be different than the hash key values generated for tunnel initiation stage 410 and multipath stage 420. In some embodiments, link aggregation stage 460 provides an even distribution of traffic across group entries for a group in pointer table 464. However, weighted distribution is possible and may be programmed by the controller.

As noted above different types of network packets may be processed in a destination resolution pipeline that selectively determines destination resolution stages to determine a forwarding decision for the network packet. FIG. 6 is a data flow diagram illustrating destination resolution stage selections for forwarding a network packet according to an Internet Protocol address, according to some embodiments. As illustrated in FIG. 6, an IP lookup 600 may be performed to determine a forwarding route associated with a network packet formatted according to IP (e.g., IPv4 or IPv6). A longest prefix matching technique may be implemented, in some embodiments, by a prior stage in the packet processor. The IP lookup 600 may return a pointer with a pointer type indicating that tunneling is to be enabled for the network packet. Tunnel initiation stage 410 may access the appropriate entry according to the group specified by the pointer and the hash value generated for the network packet. In some embodiments, the pointer in the tunnel initiation stage may identify a pointer to multipath stage 420, and thus multipath stage 420 may perform a similar lookup technique to determine a next pointer for the network packet. Alternatively, the type of pointer in tunnel initiation stage 410 may identify the pointer as a pointer into next hop address table 440. Similar to tunnel initiation stage 410, the pointer identified in next hop address stage 440 may include a pointer that is identified as link aggregation type of pointer, or may simply indicate that no further destination resolution stages are to be performed so that the forwarding decision for the network packet is finalized.

The example processing paths in FIG. 6, illustrate the many different pipeline configurations that may be provided for an IP type of network packet. IP on IP tunneling may be applied, with or without directing the network packet along one of many valid paths using weighted or equal distribution multipathing, and link aggregation may be provided (if the next hop address is a logical interface). Please note that other possible configurations for IP packets are not illustrated in FIG. 6. For example, an MPLS tunnel could be enabled for the network packet so in addition to the illustrated stages, the grayed out stages of MPLS outer label switching stage 430 and/or fast re-route stage 450 could be implemented (e.g., to push one or two MPLS labels in order initiate one or two MPLS tunnel encapsulations for the network packet). Thus, the illustrated examples are not intended to be limiting as to the various configurations of a destination resolution pipeline for an IP packet. Also note that a stage that does not perform a destination resolution operation (e.g., grayed-out), may still perform a no-op or otherwise clock through data received from a prior stage, effectively not processing data for a given network packet.

FIG. 7 is a data flow diagram illustrating destination resolution stage selections for forwarding a network packet according to MPLS, according to some embodiments. MPLS switching 700 may perform a label lookup technique to identify an MPLS action for an MPLS network packet (e.g., a label swap or label pop action). A pointer in the entry MPLS label lookup table may be identified as a multipath stage 420 pointer, an MPLS outer label stage 430 pointer, or a next hop address stage 440 pointer. The multipath stage 420 entry accessed (according to the group and pointer tables discussed above) may identify a pointer that is an MPLS outer label stage pointer 430 or a next hop address stage 440 pointer. Upon locating an entry in next hop address stage 440, the pointer contained therein may be identified as a pointer for fast re-route stage 450 or link aggregation stage 460.

The example routes in FIG. 7 illustrate the many different pipeline configurations that may be provided for an MPLS type of network packet. MPLS packets may be forwarded with or without directing the network packet along one of many valid paths using weighted or equal distribution multipathing, outer label swapping, pushing a fast re-route label, and/or providing link aggregation (if the next hop address is a logical interface). Please note that other possible configurations for MPLS packets are not illustrated in FIG. 6. For example, a tunneling initiation stage 410 could be enabled for the network packet so in addition to the illustrated stages MPLS tunnel encapsulations specified in tunnel initiation stage 410 may be used to swap a label for the network packet. Thus, the illustrated examples are not intended to be limiting as to the various configurations of a destination resolution pipeline for an MPLS packet.

FIG. 8 is a data flow diagram illustrating destination resolution stage selections for forwarding a network packet according to a Media Access Control address, according to some embodiments. MAC lookup 800 may provide an L2 lookup to determine whether a matching MAC address is found in the L2 lookup table. A pointer or virtual port identifier in the matching entry may be identified as a pointer to link aggregation stage 460 for an L2 packet. Link aggregation stage 460 identify a corresponding link aggregation entry (as discussed above) to provide link aggregation for the L2 packet. However, for other L2 packets the destination resolution pipeline may not be configured to provide link aggregation. Please note that FIG. 8 is just an example of a configuration for processing an L2 packet through a destination resolution pipeline, and thus previous discussion is not intended to be limiting to other possible destination resolution pipeline configurations for L2 packets.

The examples of selectively determining destination resolution stages for forwarding network packets and indirect destination determination to forward a tunneled network packet as discussed above with regard to FIGS. 2-8 have been given in regard to a packet processor implemented as part of a networking device. Note that various other types or configurations of networking devices that implement packet processors or devices with packet processing pipelines may implement these techniques. Moreover, different configurations of the various modules, components, or stages within a packet processor may implement selectively determining destination resolution stages for forwarding network packets or indirect destination determination to forward a tunneled network packet. In addition to examples given above, the techniques discussed below with regard to FIGS. 9-10 may be also implemented using the various components discussed above as well as different types of systems or devices that perform packet processing.

FIG. 9 is a high-level flowchart illustrating various methods and techniques to implement selectively determining destination resolution stages, according to some embodiments. As indicated at 910, a network packet may be received at a packet processor. Network packets may be a discrete portion of the stream of data transmitted over various types of network connections, such as twisted pair connections, coaxial connections, or fiber optic connections, or other wired or wireless connections formatted according to various transmission protocols. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different packet modifications, however, may be inserted to encapsulate data at differing levels of the OSI model, such as layer 2, layer 2.5, layer 3, and layer 4. In some embodiments, other types of packets such as L2 packets or MPLS packets may be received.

Various packet processing stages may be performed in order to forward the received network packet, such as described with respect to the different stages in packet processor 250 in FIG. 3. For instance, an ingress pipeline may include a packet parser to separate the payload of the network packet from packet header/metadata. Different forwarding engines, such as an L2, L3, and/or MPLS forwarding engine may evaluate information about the network packet (e.g., MAC address, destination address, or labels to determine a forwarding route for the packet, or whether to forward the packet to the controller for further processing or drop the packet. At one or more stages prior to a destination resolution stage, a pointer to a destination resolution stage may be obtained (e.g., at a forwarding engine lookup table). As indicated at 920, a pointer type for the pointer retrieved at the table lookup at the stage may be evaluated. For example, different bit values or other encodings may correspond to a known list of destination resolution stages (e.g., "01"=tunnel initiation, "10"=multipathing, "11"=link aggregation, etc.). If a next stage is identified based on the pointer type, as indicated by the positive exit from 930, then an entry in a lookup table at the identified destination resolution stage may be accessed for determining a forwarding decision for the network packet, as indicated at 940. For example, if there is a pointer type that corresponds to destination resolution stage, then the destination resolution stage may be next to perform a lookup operation. Once accessed, the technique may be repeated (as illustrated by the arrow returning to element 920). In at least some embodiments, the entry to be accessed may be located by locating a group in a group table, as discussed above with regard to FIG. 5, and using a hash value generated for the destination resolution stage to locate the entry in a pointer table that includes a group of entries assigned to the group identified by the pointer.

Some pointers may point to information, tables, or other processing stages at a packet processor that are not destination resolutions stages. Moreover, some destination resolution stages may be triggered or performed based on other settings or conditions that are not initiated by a pointer to that stage (e.g., such as some implementations of fast re-route stage). Some destination resolution stages may always be performed and thus if no pointer is retrieved at one stage identifying a next destination resolution stage, then it may be that a destination stage that is always performed is performed next. The stage that is always performed may then include a pointer to a next stage. In this way, various combinations of stages which provide pointers to a next stage or no pointers to a next stage may be implemented in a destination resolution pipeline. If no further destination resolution stages are identified (or remain to be performed even if not identified by a pointer), as indicated at 930, then the network packet may be forwarded according to the forwarding decision determined as result of the different destination resolution stages that have been performed. A forwarding decision may include one or multiple modifications to be made to a network packet, whether modifications that just change metadata, such as various hop counts or error detection codes, or modifications that add tunnel encapsulations, labels, or other properties or additions/removals from a network packet.

Figure 10:
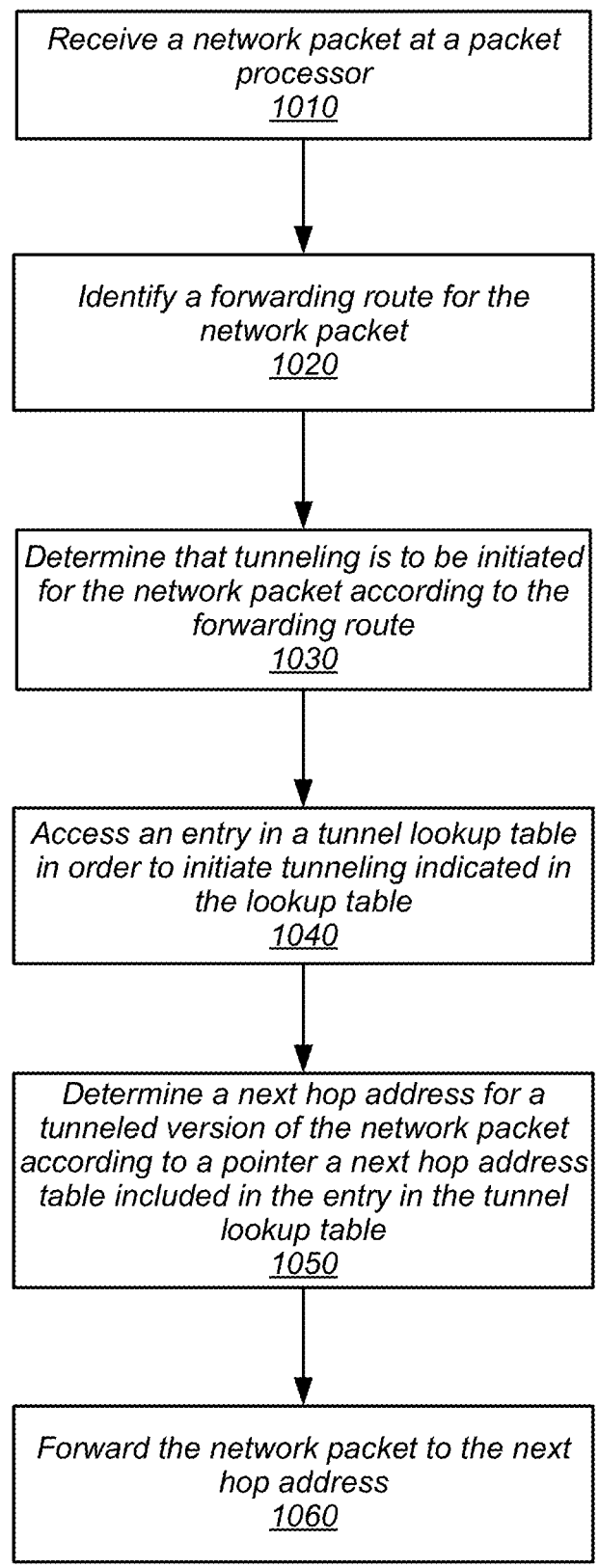
FIG. 10 is a high-level flowchart illustrating various methods and techniques to implement indirect destination determinations to forward tunneled network packets, according to some embodiments.

FIG. 10 is a high-level flowchart illustrating various methods and techniques to implement indirect destination determinations to forward tunneled network packets, according to some embodiments. Similar to the discussion above with respect to element 910, a network packet may be received at a packet processor. In various embodiments, a forwarding route may be determined for the network packet. For instance, an L3 forwarding engine may identify a forwarding route with a longest common prefix with respect to a destination address for the network packet.

As indicated at 1030, a determination may be made that tunneling is to be initiated for the network packet according to the identified forwarding route. For example, in at least some embodiments, an entry in a lookup table maintaining the forwarding route identified for the network packet may include an indication that tunneling is to be enabled, such as by including a pointer to a tunneling lookup table. In some embodiments, other mechanisms such as access control list engine may evaluate the network packet and identify that tunneling is to be initiated for the network packet.

As indicated at 1040, an entry in a tunnel lookup table may be accessed in order to apply tunneling described in the lookup table. As mentioned above with regard to element 940 in FIG. 9 and discussed above with regard to FIG. 5, in at least some embodiments, the entry to be accessed may be located identifying a tunnel group for the forwarding route according to a pointer located or associated with the forwarding route. Once the tunnel group is identified, then a tunnel hash value may be used to index into the group of entries in a pointer table.

As indicated at 1050, a next hop address may be determined for a tunneled version of the network packet according to a pointer stored in the entry in the tunnel lookup table. The pointer may be a pointer directly to a next hop address table (e.g., next hop address stage 440 in FIG. 4) or may be a pointer to another destination resolution stage, such as multipath stage 420 which may have another entry that points to a next hop address in the next hop address table. Once the next hop address is determined, then as indicated at 1060, the network packet maybe forwarded according to the next hop address.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
   a plurality of physical network interfaces; and
   a packet processor, configured to:
   receive a network packet at a first stage via one of the physical network interfaces;
   individually select one or more destination resolution stages of a plurality of destination resolution stages at the packet processor, different from the first stage, to determine a forwarding decision for the network packet, wherein for individual selections of the one or more destination resolution stages, the first stage of the packet processor is configured to:
   identify a pointer type of a pointer included in an entry of a lookup table accessed at a stage of the packet processor prior to the first stage, wherein the pointer type indicates a next destination resolution stage for the determination of the forwarding decision; and
   send the network packet via one of the physical network interfaces according to the forwarding decision.

2. The networking device of claim 1, wherein the packet processor is further configured to:
   receive another network packet, wherein the other network packet is a different type of network packet than the network packet; and
   perform the individual selection of one or more destination resolution stages for the other network packet, wherein at least one of the one or more destination resolution stages selected for the other network packet is different than the one or more destination resolution stages selected for the network packet.

3. The networking device of claim 2, wherein the other network packet is a Layer 3 (L3) type of network packet.

4. The networking device of claim 1, wherein to determine the entry of the lookup table accessed at the prior stage, the packet processor is configured to:
   identify a group of elements in a group table for the prior stage; and
   select one element of the group of elements according to a hash value generated for the prior stage, wherein the selected element maps to the entry of the lookup table accessed at the prior stage.

5. A method, comprising:
   receiving, at a first stage of a packet processor, a network packet;
   identifying, by the first stage of the packet processor, one or more of a plurality of destination resolution stages at the packet processor, different from the first stage, to perform lookup operations for the network packet such that a forwarding decision for the network packet is determined by the identified one or more stages, wherein the identifying of individual ones of the one or more destination resolution stages comprises:
   evaluating a respective pointer type for a pointer read from a table lookup at a stage of the packet processor prior to the first stage that identifies the destination resolution stage as a next stage to perform a lookup operation for the determining of the forwarding decision for the network packet; and
   forwarding, by the packet processor, the network packet according to the forwarding decision.

6. The method of claim 5, wherein the identifying of the individual ones of the one or more destination resolution stages further comprises:
   identifying a group of elements at a group table of the prior stage; and
   selecting one of the group of elements according to a hash value generated for the prior stage, wherein the selected element maps to an entry read in the table lookup at the prior stage that includes the pointer.

7. The method of claim 6, further comprising generating, by the packet processor, the hash value for the prior stage according to values in one or more header fields of the network packet.

8. The method of claim 7, wherein the one or more header fields are specified by a controller for the packet processor prior to the generation of the hash value.

9. The method of claim 6, wherein the group of elements are assigned different weights according to a weighted distribution scheme.

10. The method of claim 5, wherein at least one of the one or more destination resolution stages is a next hop address stage.

11. The method of claim 10, wherein at least one other of the one or more destination resolution stages is:
    a tunnel initiation stage;
    a multipath stage;
    a multiprotocol outer label stage;
    a fast reroute stage; or
    a link aggregation stage.

12. The method of claim 5, further comprising:
    receiving another network packet at the packet processor, wherein the other network packet is a different type of network packet than the network packet; and
    performing the identifying of the one or more destination resolution stages for the other network packet, wherein at least one of the one or more destination resolution stages that determine the forwarding decision for the other network packet is different than the one or more destination resolution stages that determine the forwarding decision for the network packet.

13. The method of claim 12, wherein the other network packet is a multiprotocol label switching (MPLS) type of network packet.

14. A system, comprising:
    a device configured to perform packet processing, the device comprising;
    one or more network interfaces configured to transmit and receive packets via a network connection to the device; and
    a packet processing pipeline, comprising a first stage and a plurality of destination resolution stages different from the first stage that determine a forwarding decision for a network packet received at the first stage via one of the network interfaces;
    wherein to determine the forwarding decision for the network packet, the first stage of the packet processing pipeline is configured to:
    select one or more of the destination resolution stages according to respective pointers obtained at other stages in the packet processing pipeline that identify the one or more destination resolution stages.

15. The system of claim 14, wherein one of the other stages is one of the selected destination resolution stages, where to obtain the respective pointer at the selected destination resolution stage, the selected destination resolution stage is configured to:
- identify a group of elements in a group table for the selected destination resolution stage according to another pointer obtained at a prior stage of the packet processing pipeline; and
- select one element of the group of elements according to a hash value generated for the selected destination resolution stage; and
- read an entry in a pointer table for the selected destination resolution stage mapped to the selected element, wherein the entry includes the respective pointer that identifies another destination resolution stage.

16. The system of claim 15, wherein the packet processing pipeline is further configured to generate, at a stage prior to the plurality of destination resolution stages, the hash value for the selected destination resolution stage according to respective values in one or more header fields of the network packet.

17. The system of claim 16, wherein the stage prior to the plurality of destination resolution stages generates another hash value for another network packet received via one of the network interfaces, wherein the other hash value is used to select an element of another group of elements at another group table for another destination resolution stage of the plurality of destination resolution stages as part of a forwarding decision determination at selected destination resolution stages including the other destination resolution stage for the other network packet.

18. The system of claim 17, wherein at least one of the selected destination resolution stages for the other network packet is different than the one or more selected destination resolution stages for the network packet.

19. The system of claim 14, wherein the network packet is a Layer 2 (L2) type of network packet.

20. The system of claim 14, wherein the device is an application specific integrated circuit (ASIC), a system-on-chip (SoC), or a field-programmable gate array (FPGA).

* * * * *